(12) United States Patent
Hoffmann et al.

(10) Patent No.: US 8,029,233 B2
(45) Date of Patent: Oct. 4, 2011

(54) WIND TURBINE AND METHOD FOR CONTROLLING A WIND TURBINE

(75) Inventors: Till Hoffmann, Osnabrueck (DE); Julian Quindt, Osnabrueck (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/872,659

(22) Filed: Aug. 31, 2010

(65) Prior Publication Data
US 2011/0142622 A1 Jun. 16, 2011

(51) Int. Cl.
*F04D 29/00* (2006.01)
(52) U.S. Cl. .......................................... 415/118
(58) Field of Classification Search .................. 415/118; 290/44
See application file for complete search history.

(56) References Cited

U.S. PATENT DOCUMENTS

| 4,573,358 A | * | 3/1986 | Luongo | 73/660 |
| 7,322,794 B2 | * | 1/2008 | LeMieux et al. | 416/40 |
| 2008/0303281 A1 | * | 12/2008 | Krueger | 290/44 |

* cited by examiner

*Primary Examiner* — Edward Look
*Assistant Examiner* — Dwayne J White
(74) *Attorney, Agent, or Firm* — Global Patent Operation; Douglas D. Zhang (57) ABSTRACT

The disclosure relates to a method for controlling a wind turbine including a wind rotor shaft, a rotary encoder for measuring the azimuth angle of the wind rotor shaft, wherein the wind turbine further includes at least one impulse generating device including at least one first part and at least one second part, wherein the at least one first part is rotating with the wind rotor shaft and the least one second part is disposed stationary with respect to the wind rotor shaft such that the at least one first part moves by the at least one second part; wherein the method includes: encoding the azimuth angle of the wind rotor shaft by the rotary encoder into a rotation value; generating an impulse when one of the at least one first part moves by one of the at least one second part of the impulse generating device; comparing the rotation value at the time of a detected impulse with a reference value.

20 Claims, 7 Drawing Sheets

| Bolt | Increment rising edge | Increment falling edge | Bolt center |
|---|---|---|---|
| 1 | 390 | 415 | 402 |
| 2 | 660 | 685 | 672 |
| 3 | 930 | 955 | 942 |
| 4 | 1199 | 1224 | 1212 |
| ... | ... | ... | ... |

Fig. 8

| Bolt | Increment rising edge | Increment falling edge | Bolt center | Center difference |
|---|---|---|---|---|
| 1 | 389 | 415 | 402 | 0 |
| 2 | 657 | 686 | 671 | 1 |
| 3 | 929 | 953 | 941 | 1 |
| 4 | 1199 | 1226 | 1213 | -1 |
| 5 | ... | ... | ... | ... |
| ... | | | | |

Sum: 10

| Bolt | Increment rising edge | Increment falling edge | Bolt center | Center difference |
|---|---|---|---|---|
| 1 | 420 | 445 | 432 | 30 |
| 2 | 690 | 716 | 703 | 31 |
| 3 | 958 | 983 | 971 | 29 |
| 4 | 1229 | 1256 | 1242 | 31 |
| 5 | ... | ... | ... | ... |
| ... | | | | |
| | | | Sum: | 801 |

WIND TURBINE AND METHOD FOR CONTROLLING A WIND TURBINE

BACKGROUND

The present disclosure relates to a wind turbine. Further, the present disclosure relates to a method for controlling a wind turbine.

Typically, the rotor azimuth position is measured by an incremental encoder that encodes the angle of a low speed shaft. The information from the rotary encoder may be used in typical embodiments to control a pitch angle of the wind rotor blades. In the event that the rotary encoder is not calibrated, for example if a gear box of a wind turbine has been changed without a recalibration of the rotary encoder, the rotor position error may cause an asymmetrical load control and significantly increases the turbine loads. Further, it may decrease the annual energy production of a wind turbine.

Typically, a referencing procedure of a rotary encoder requires the rotor to be stopped in a certain position. Then, a small coupling has to be attached and the encoder pin or the rotary encoder has to be turned until the rotary encoder generates a zero degree pulse or value. Then, the coupling is fixed again. Typically, the rotary encoder is fixed to a low speed shaft of a wind turbine by the coupling. The low speed shaft/rotor-position-encoder coupling is typically difficult to adjust and a potential source of referencing errors.

BRIEF DESCRIPTION

In view of the above, a method for controlling a wind turbine is provided including a wind rotor shaft, a rotary encoder for measuring the azimuth angle of the wind rotor shaft, wherein the wind turbine further includes at least one impulse generating device including at least one first part and at least one second part, wherein the at least one first part is rotating with the wind rotor shaft and the least one second part is disposed stationary with respect to the wind rotor shaft such that the at least one first part moves by the at least one second part; wherein the method includes: encoding the azimuth angle of the wind rotor shaft by the rotary encoder into a rotation value; generating an impulse when one of the at least one first part moves by one of the at least one second part of the impulse generating device; comparing a rotation value at the time of a detected impulse with a reference value.

According to a further aspect, a wind turbine is provided including a wind rotor shaft, a rotary encoder for measuring the azimuth angle of the wind rotor shaft and for encoding the azimuth angle with a rotation value; wherein the wind turbine further includes at least one impulse generating device including at least one first part and at least one second part, wherein the at least one first part is rotating with the wind rotor shaft and the least one second part is disposed stationary with respect to the wind rotor shaft such that the at least one first part moves by the at least one second part; wherein the impulse generating device is adapted to generate an impulse when an at least one first part moves by an at least one second part; wherein the wind turbine further includes a control device adapted to receive a rotation value of the rotary encoder and adapted to be connected to the impulse generating device, wherein the control device is adapted to compare a rotation value of the rotary encoder at the time of a detected impulse with a reference value.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Figure 1:
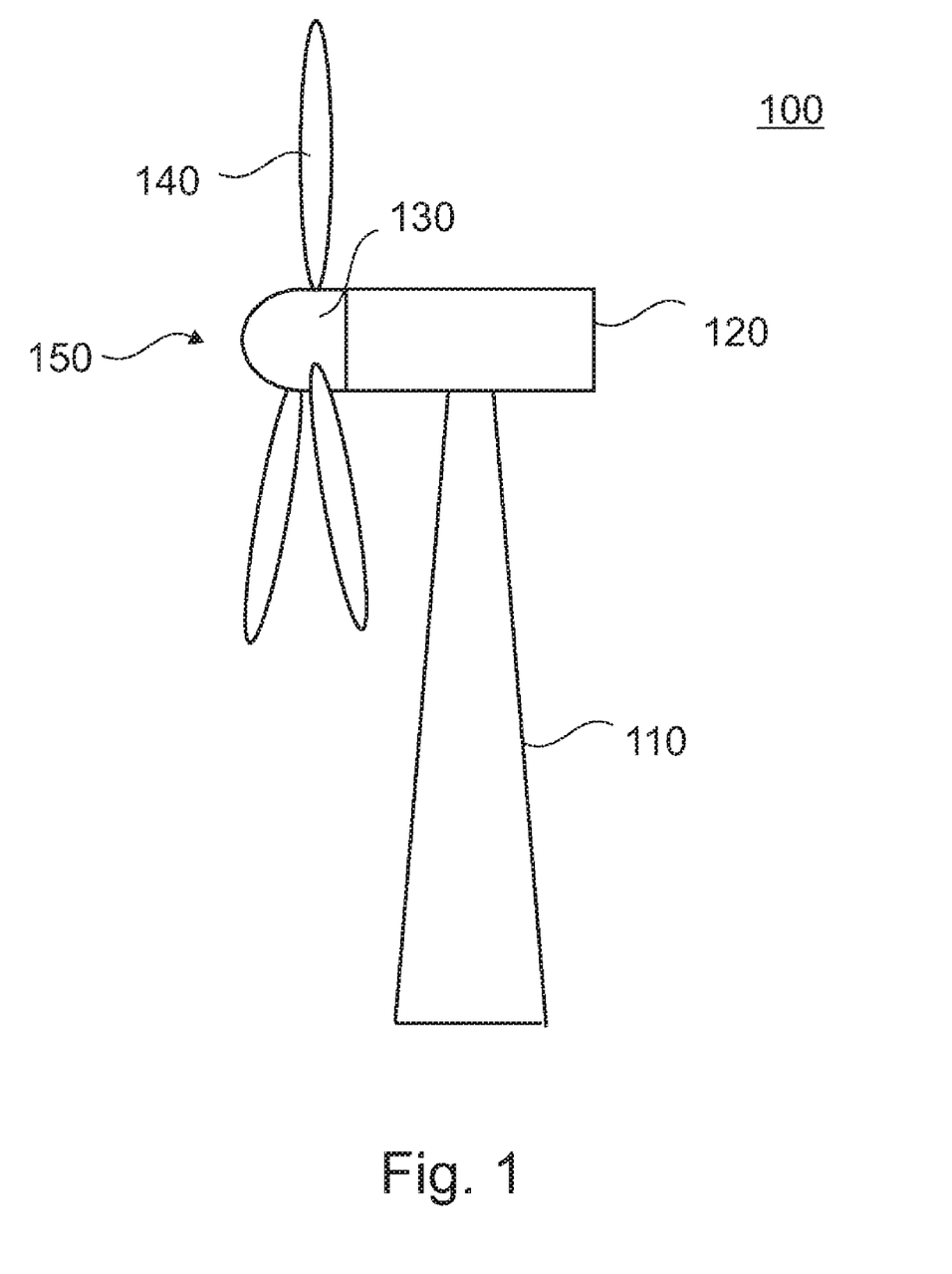
FIG. 1 shows an embodiment of a wind turbine.

FIG. 1 shows a wind turbine 100. The wind turbine 100 includes a tower 110 on which a nacelle 120 is mounted. The nacelle 120 is rotatable about a vertical axis of the tower. Within the nacelle 120, a generator (not shown) for transforming rotational energy into electrical energy is placed. The generator is connected to a hub 130 that is rotatable about a horizontal axis. Three rotor blades 140 are connected to the hub 130. The rotor blades 140 and the hub 130 together form a wind rotor of the wind turbine 100. The wind turbine 100 operates as follows. In a typical situation, the nacelle 120 is rotated about the vertical axis such that the horizontal axis of the hub 130 is approximately parallel to a wind direction. The wind exerts a torque on the wind rotor due to an aerodynamical profile of the rotor blades 140. Accordingly, the wind rotor rotates about its horizontal axis, thus driving the generator. The generator transforms the mechanical rotation into an electric current. Hence, the kinetic energy of the wind is transformed into electric energy.

Figure 2:
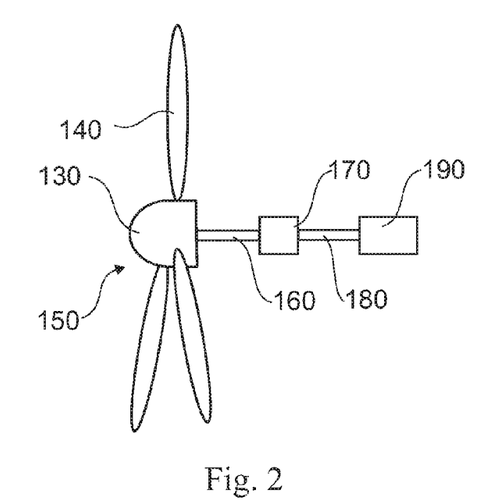
FIG. 2 shows schematically an embodiment of a drive train of a wind turbine.

FIG. 2 shows an embodiment of a drive train of a wind turbine. The wind rotor 150 is connected by a wind rotor shaft 160 to a gear box 170. The wind rotor shaft is, in a typical embodiment, also called low speed shaft. In the gear box 170 a first rotational speed of the wind rotor shaft is converted into a second rotational speed which is transmitted via a generator shaft 180 to a rotor of a generator 190. The generator 190 transforms the rotational power of the generator shaft to electrical power that may be fed into a grid.

Figure 3:
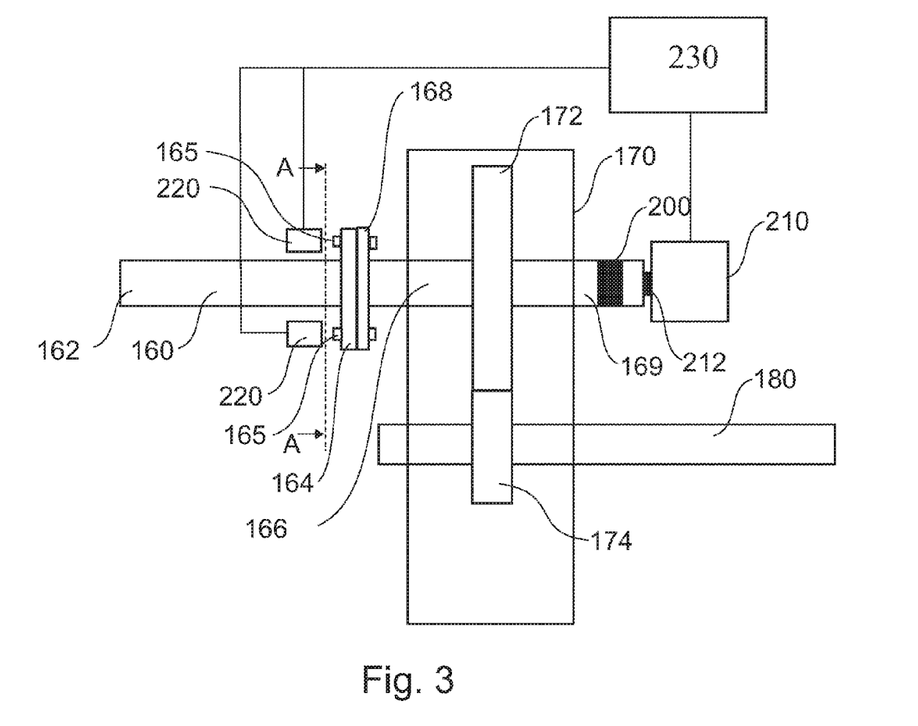
FIG. 3 shows schematically an embodiment of a gear box and a part of a wind rotor shaft.

Typically, as shown in FIG. 3, the wind rotor shaft 160 includes a wind rotor portion 162 between the wind rotor and a flange 164 and a gear box portion 166 which includes a flange 168 which is connected to the flange 164 of the wind rotor portion 162. The flange of the gear box portion 168 and the flange 164 of the wind rotor portion 162 of the wind rotor shaft 160 are fixed to each other with bolts 165.

FIG. 3 shows a schematical drawing of an embodiment of a gear box. The gear box may include a big driving gear 172 disposed on and rotating with the wind rotor shaft 160, in particular with the gear box portion 166, and a small driven gear 174 that drives the generator shaft 180. The driving gear 172 and the driven gear 174 engage each other. Further, a stump 169 of the gear box portion 166 extends out of the gear box 170 in the opposite direction to the wind rotor 150. A contact ring 200 may be disposed in a typical embodiment on the stump 169. The contact ring may be used for transmitting electrical signals from a controller to the wind rotor 150. Further, a rotary encoder 210 is coupled to the stump 169 of the wind rotor shaft 160. In a typical embodiment, the rotary encoder is connected to the wind rotor shaft 160 by a coupling 212. The rotary encoder converts, in a typical embodiment, an angular position of the wind rotor shaft 160 to an analog or digital code. Thus, the rotary encoder may act as an angle transducer. In a typical embodiment, which may be combined with other embodiments disclosed herein, the rotary encoder may be an incremental encoder. Typically, an incremental encoder encodes the rotary position into a number. For example, the incremental encoder or the angular encoder may count from zero to approximately 8000 for a complete rotation of the wind rotor shaft 160. When a rotation is completed, the rotary encoder starts again to count from zero.

In a further embodiment, the rotary encoder may be placed at another position of the wind rotor shaft. In a further embodiment, the rotary encoder may be connected to the wind rotor shaft 170 via a gear.

In a typical embodiment, one or more proximity sensors 220 is or are disposed, to generate an impulse when a bolt 165 is passing by. The rotary encoder 210 and the proximity sensors 220 are connected to a controller 230. In a further embodiment, which may be combined with other embodiments disclosed herein, one or more proximity sensors may rotate with the wind rotor shaft 160 and an impulse element, for example a bolt may be disposed stationary close to the wind rotor shaft, such that an impulse is generated by the proximity sensor when the proximity sensor passes or moves by the bolt.

Figure 4:
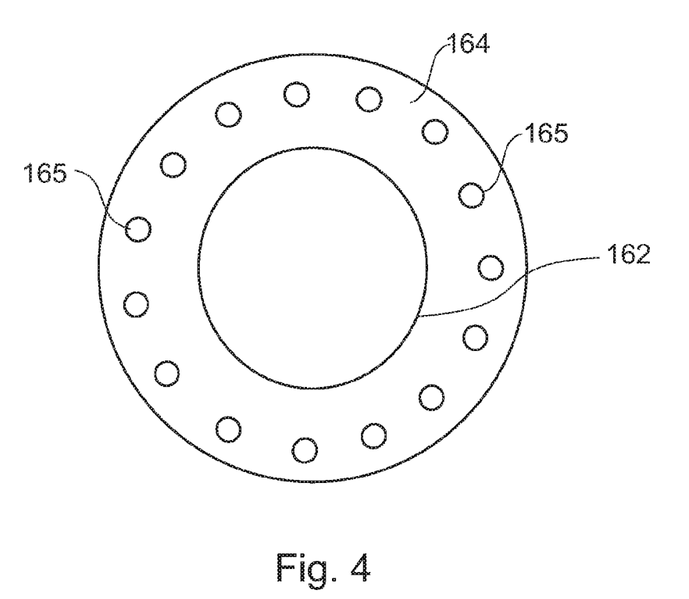
FIG. 4 shows schematically a cross section of a wind rotor shaft.

FIG. 4 shows a cross sectional view of the wind rotor shaft of section A-A of FIG. 3. As it can be seen from FIG. 4, a plurality of bolts 165 are disposed at a regular distance to each other around the flange 164 of the wind rotor portion 162 of the wind rotor shaft 160. In another embodiment, the flanges 164, 168 of the wind rotor portion 162 and the gear box portion 166 of the wind rotor shaft 160 may be fixed to each other by 30 bolts 165.

In other embodiments, the flange may include more or less bolts 165. In a further embodiment, the distance between two adjacent bolts may be increased sequentially along the perimeter of the wind rotor shaft. Thus, if the wind rotor shaft is rotating with a constant speed, the time between two consecutive impulses increases until a complete rotation is finished. Then, the sequence with the increasing time between two consecutive impulses starts again.

Figure 5:
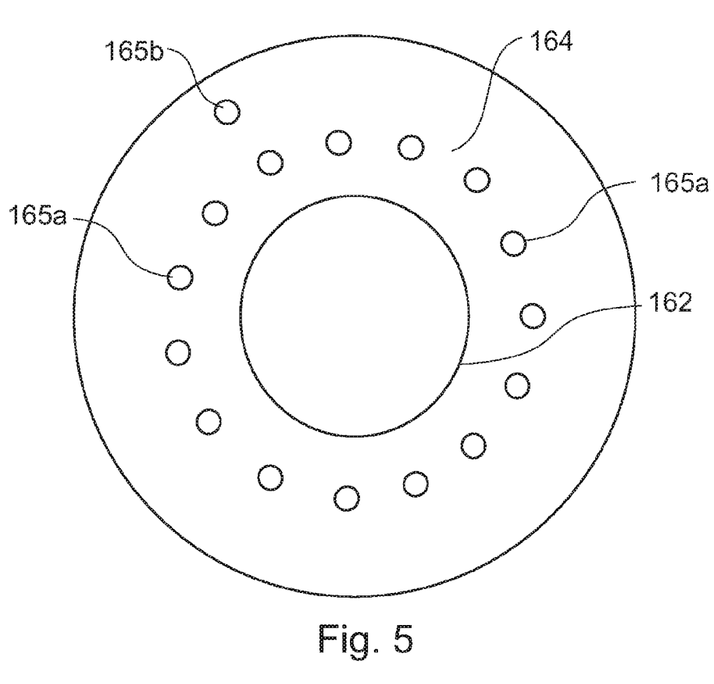
FIG. 5 shoes schematically a cross section of another embodiment of a wind rotor shaft.

In a further embodiment, as shown in FIG. 5, the flange may include a plurality of bolts 165a for fixing the flange of the wind rotor portion 162 of the wind rotor shaft 160 to the flange 168 of the gear box portion 166 of the wind rotor shaft 160 and a specific detection bolt 165b disposed radially outward of the connection bolts 165a. Typically, a proximity sensor 220 may be disposed to detect a passing by of the detection bolt 165b.

Figure 6:
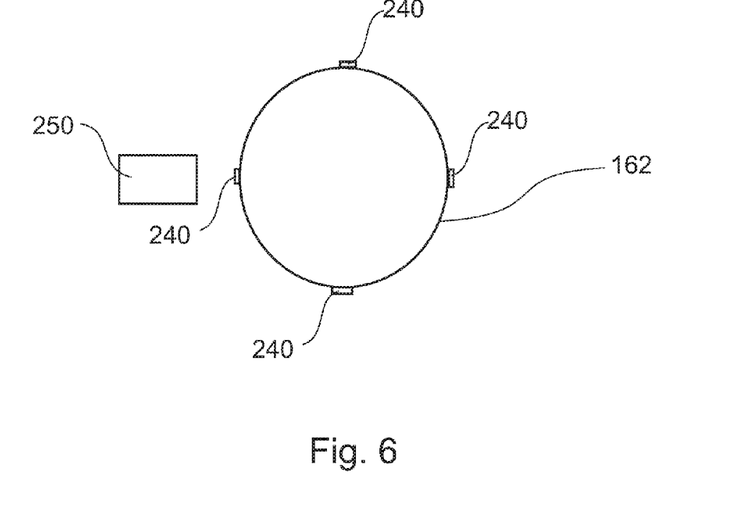
FIG. 6 shows schematically a cross section of a further embodiment of a wind rotor shaft.

In a further embodiment shown in FIG. 6, that shows a cross section of the wind rotor shaft 160, one or more detection marks 240 are disposed at regular intervals around the wind rotor shaft 160. A detection mark sensor 250 is disposed to detect the passing by of a detection mark 240 and to generate an impulse, when the detection mark passes or moves by.

In a typical embodiment, the over speed proximity switches at the low speed shaft/gear box/flange may be used for a relative supervision of the rotor azimuth angle.

Figure 7:
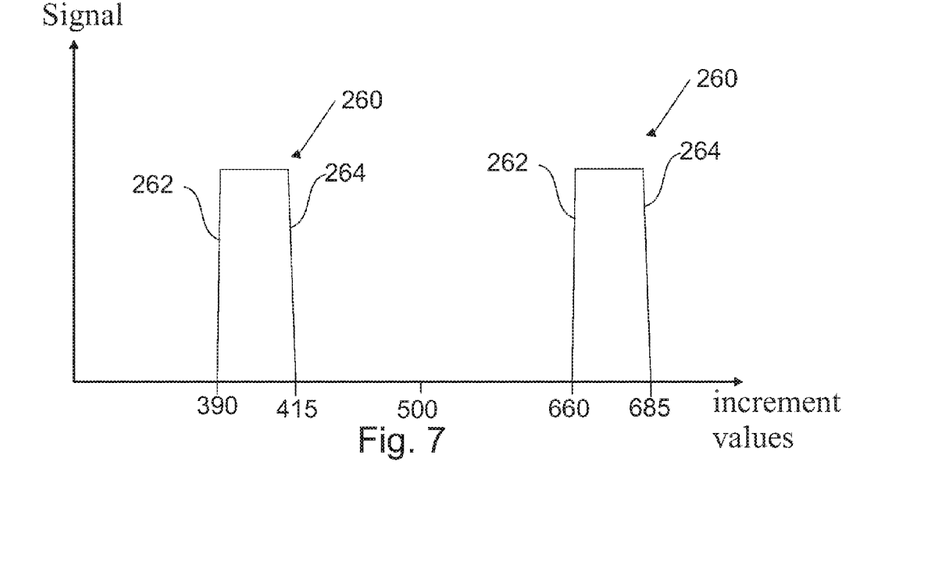
FIG. 7 shows schematically impulses of an impulse generating device.

FIG. 7 shows schematically a signal generated by a proximity sensor 220 or by a detection mark sensor 250, when the wind rotor shaft is rotating at a constant rotational speed. Whenever, a bolt 165, 165a, 165b or a detection mark 240 passes by, the detection mark sensor 250 or the proximity sensor 220 generates an impulse 260. In a typical embodiment, the impulse 260 is a substantial rectangular signal, including a rising etch 262 and a falling etch 264. The rotary encoder 210, as already described here above, in a typical embodiment, encodes the rotation angle into a number value. For example, such values encoded by the rotary encoder are shown below the horizontal axis in FIG. 7. Thus, each rising etch 262 and each falling etch 264 have a corresponding rotation value generated by the rotary encoder.

In a typical embodiment, the values output by the rotary encoder when a bolt is passing by the proximity sensor or when a detection mark is passing by a detection mark sensor are stored in a data base or an array, in particular during a calibration run. In an embodiment, a calibration run is also called a referencing procedure.

In a typical embodiment, a referencing procedure is performed automatically, and not mechanically, by setting a parameter which contains the offset between the rotor azimuth at the zero degree pulse of the rotational encoder and the true wind rotor azimuth of zero degrees. In a typical embodiment, changes to this parameter may be access restricted. In a further embodiment, the actual value of the parameter should display the current rotor azimuth position for validation.

In another embodiment, the referencing procedure of the rotor azimuth angle may be done during commissioning of the wind turbine. Further, a referencing procedure may be carried out when an error message is generated (see below). Typically, such an error message may not be reset before a new value of the rotor azimuth offset has been entered.

In an embodiment, a supervision controller may require a set of reference positions, which may be stored permanently in an array having the size of the number of bolts or detection marks monitored in one complete rotation, or in a database. In a typical embodiment, when 30 bolts are monitored, the array may include 30 values. Initially these values may be zero. Typically the values may be reset to zero each time the rotor azimuth angle referencing procedure is done. In an embodiment, if this array of values or the database is found to be zero during an idling for a cut-in, the array or database may be filled with the values of the wind rotor position encoder, typically the number of an increment of an increment encoder, at each impulse or pulse generated by the proximity sensor or the detection mark sensor, in particular in the middle between the pulses rising and falling etches. Typically, when a wind turbine is idling, the generator of the wind turbine is not already connected to the grid. Before the generator is connected to the grid, a pitch angle of the rotor blades is changed, to accelerate the wind rotor to a speed at which the generator is optimally connected to the grid. The moment when the wind rotor is accelerating is called cut-in.

Figure 8:
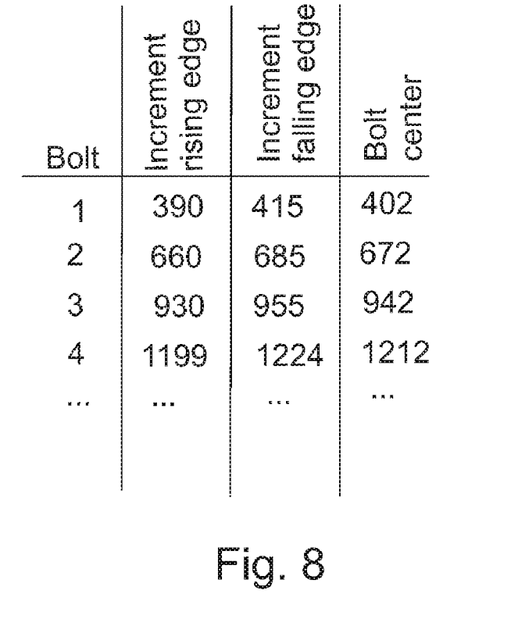
FIG. 8 shows an array of values after a calibration run.

In FIG. 8, a typical array of values is shown. The embodiment shown in FIG. 8 shows only the values of a rotary encoder of four bolts. Typically, the number of bolts in the array shown in FIG. 8 corresponds to the number of bolts which may be detected by the proximity sensor 220 or by the numbers of detection marks that are detected by the detection mark sensor 250. In a further embodiment, the array may include data for 30 bolts. In a referencing procedure, for each bolt, a rising etch and a falling etch is recorded. For example, for a first bolt, the rising etch may be at an increment value of the rotary encoder of 390 and the falling etch may be at an increment value of the rotary encoder of 415. Thus, a bolt center may be calculated, as shown in FIG. 8. For example, the bolt center of the bolt 1 is the mean value of the increment value of the rising etch and the increment value of the falling etch, and thus 402. For the other bolts that are detected by the proximity sensor or the detection mark sensor, the bolt center may be calculated in a similar way.

Further, a certain minimum activation and deactivation time of the pole pulse may be checked or measured, to prevent false counts caused by a shattering sensor.

A "rotor azimuth position offset"-value may be set in a typical embodiment in a data base or reference table in a rotor azimuth position referencing procedure. This procedure is typically necessary when the default parameter set is loaded, a flange coupling in the drive train has been opened, or the rotor position encoder has been detached or modified.

Typically, the idea is to use a signal that is already available to realize a supervision of a rotary encoder, for example an incremental encoder at the low-speed shaft that measures the azimuth angle of the rotor. The bolt impulses of proximity sensors at the low speed shaft that are used for over speed detection may be suitable for this purpose. In other embodiments, specific sensors may be installed for this purpose as described above. It is possible to implement a relative supervision of the azimuth angle of the wind rotor by comparing the measured bolt impulse pattern to a previously, in particular during a referencing procedure, stored reference pattern. Typically, if there is shift in the azimuth angle, these two patterns will not match. In this case the wind turbine may be operated in a power curtailed mode. This will prevent certain control-lubes from increasing load due to a phase shifted rotor position input signal, for example reacting too late or too early. Such a control-loop may be an asymmetric load control which relies on a correct rotor position measurement.

Figure 9:
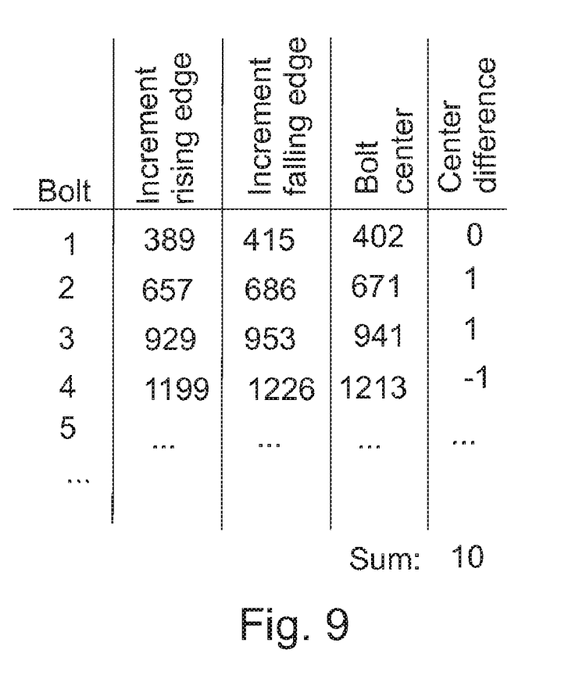
FIG. 9 shows a further array of values after a supervision run.

In a typical embodiment, in a supervision run, the bolt impulses are measured, and the respective value of the incremental encoder or rotary encoder is compared to the value stored in the array or a database. For example, the value may be compared with the value stored in the way shown in FIG. 8. In FIG. 9 the bolts and the respective incremental values of the rotary encoder of the rising etch and the falling etch are shown. As the rotary encoder and the bolts have no angular offset with respect to the values measured in the calibration procedure, the difference between the calculated bolt centers is only small. For example for the bolt 1, the difference of the supervision rm during an idling rotation of the wind turbine makes no difference to the incremental value of the center of the bolt in the calibration run. The bolt 2 has a difference of +1 as well as bolt 3. These errors may be due to small measurement errors.

In a typical embodiment, the difference between the values measured in the supervision run and the incremental values measured in the calibration run of the bolt centers are added, in particular the values of a complete rotation. For example, the sum of the differences of the bolt centers of each bolt may be ten.

Typically, the algorithm may calculate a sum of the deviation of all positions in array/positions-at-pulse comparison per revolution. This has the advantage that most statistical deviations will eliminate themselves. Systematical deviation will only occur in one direction. When calculating the sum, it is important that the encoder reset from the maximum value to zero is taken into account, because the incremental encoder or rotary encoder starts at each rotation again from zero and then counts upwards or downwards to a specific value.

Figure 10:
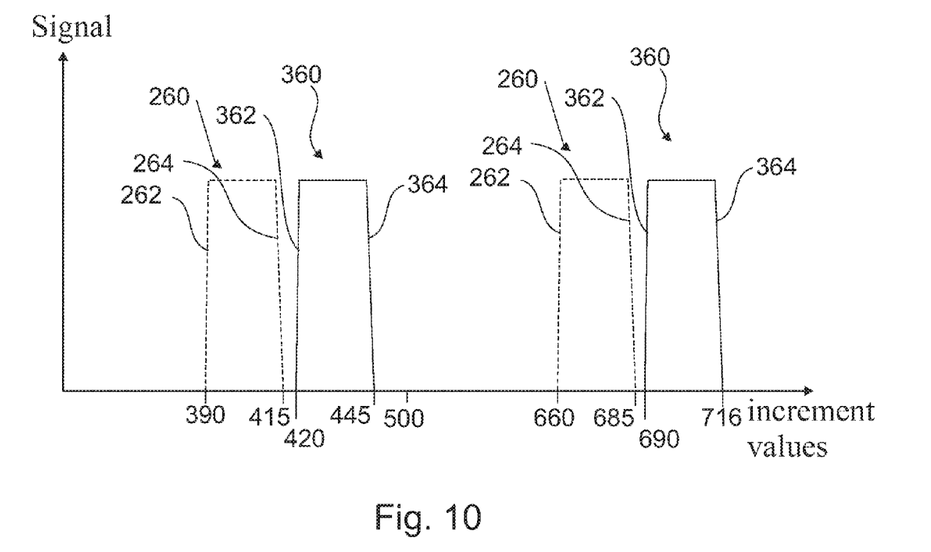
FIG. 10 shows schematically impulses of an impulse generating device in a supervision run.

FIG. 10 shows an embodiment, where the pulses of the proximity sensor or the detection mark reader are shown with respect to a part of the rotation of the wind rotor shaft. On the horizontal axis, the incremental values of the rotary encoder are shown. The impulses 260 with dotted lines correspond to the impulses which were measured in a calibration run. Thus, they correspond to the impulses shown in FIG. 7. The impulses 360, each having a rising etch 362 and a falling etch 364, correspond to measured impulses in a supervision run. These impulses are shown with straight lines in FIG. 10. As it can already be seen in FIG. 10, the rotary encoder has a systematic angular offset with respect to the measured detection marks or bolts.

Figure 11:
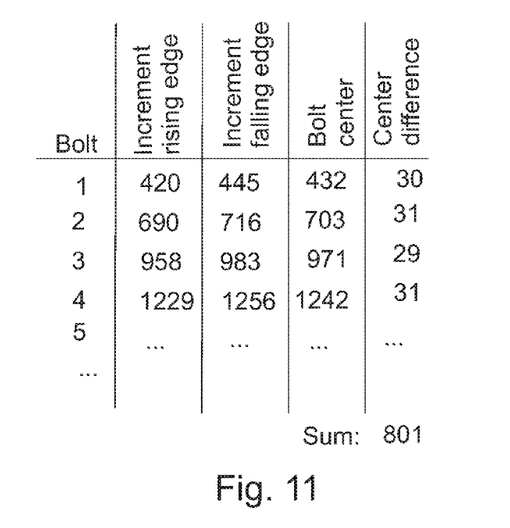
FIG. 11 shows another array of values after a supervision run.

The table of FIG. 11 shows an example of measured incremental values of the rising etch and the falling etch of the respective bolts or detection marks. From these values, as in the previous supervision run table shown in FIG. 9, the bolt center or the detection mark center may be calculated. Then, the calculated center of the bolts or the detection marks are compared with the center of the bolts or detection marks stored in a table, database or in an array that were acquired during the calibration run as shown in the table of FIG. 8. As it can be seen from the difference, the calculated or measured incremental values shown in FIG. 8 have a systematic deviation of about 30. Thus, in a typical embodiment, it may be concluded that the rotary encoder has to be recalibrated or remounted to the wind rotor shaft. The deviation values are added together for a complete rotation of the wind rotor shaft. In the example shown in FIG. 11, the sum of all deviation errors is about 800.

In a typical embodiment, an alarm signal may be generated, if the sum of the deviation exceeds a predetermined threshold value. The predetermined threshold value may be chosen depending on the acceptable angular offset of the rotary encoder.

Typically, the calculated sum of all deviations may be compared to a threshold, which is defined by a parameter. The threshold default may be, for example, 300 increment values (either in a positive or negative direction). For example, this way may be chosen if the supervision is based on thirty bolts at a flange of the wind rotor shaft and the rotary encoder needs about 8000 steps for a complete rotation. In this case, a detectability of about 10 increment deviations is used, which is slightly less than 0.5 degree. In a typical embodiment, an undetectable interval remains 1 degree around a bolt.

In a further embodiment, a new task may run at 10 milliseconds execution time to gain sufficient accuracy of the signal flange measurements. For example, if the sum of the deviations as shown in FIG. 11 exceeds the predetermined value, an alarm may be triggered. In a further embodiment, a warning is triggered which may, for example, curtail the power.

Figure 12:
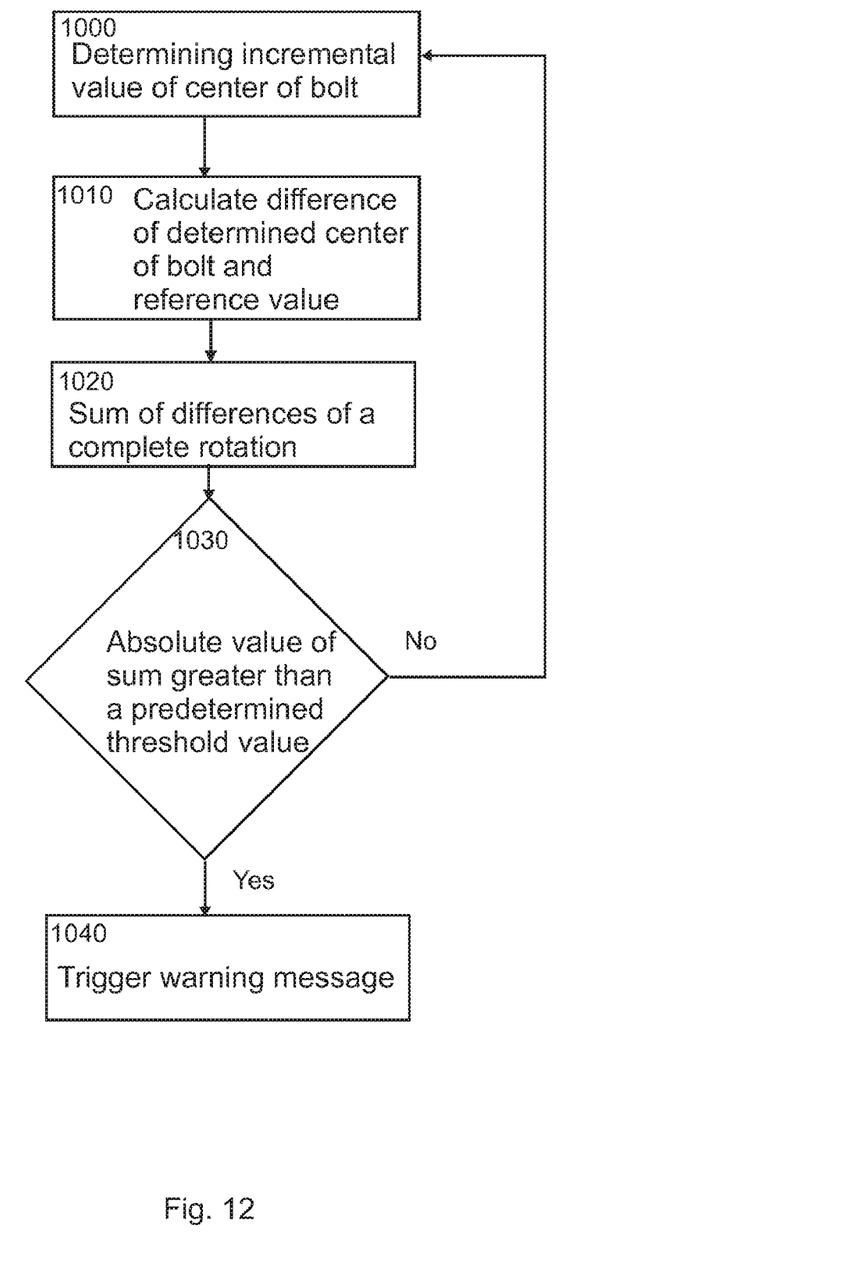
FIG. 12 shows a flow chart of a method for operating a wind turbine.

FIG. 12 shows a schematic flow diagram of a method showing a supervision run. In a first step 1000, an incremental value of the center of a bolt or a detection mark is determined.

This may be done, for example, by calculating the mean value between a rising etch and a falling etch of the signal of a sensor. In a further embodiment, the sensor only triggers a small impulse that corresponds approximately only to a small number of incremental values, for example one to three incremental values, and provides this to a respective unit of a control device. In a further step (step 1010) the incremental value of the bolt center or the center of the detection mark is compared with a stored incremental value of the bolt center or the detection mark.

In a further embodiment, not the bolt center or the center of a detection mark is compared with a reference value accurate during a calibration nm, wherein the incremental value of a center of a bolt or a center of a detection mark was recorded, but only the rising etch or the falling etch are used to compare the respective values of the rotary encoder.

In a further step 1020, the sum of the difference between the measured values and the reference values is calculated for a complete rotation of the wind rotor shaft.

In a further step 1030, the absolute value of the sum is compared with a predetermined threshold value. In case the absolute value of the sum is below that threshold value, the procedure starts again at step 1000.

In the event that the absolute value of the sum exceeds the predetermined threshold value, a warning message is triggered in step 1040.

In a typical embodiment, the supervision algorithm or method may run when the turbine is idling or spanning for cut-in. During this run, it will detect the relative rotor position changes by comparing the values of the position encoder at the middle of each bolt pulse, which may be generated by an over speed proximity sensor located at the low speed shaft/gear box-coupling, to a set of persistently stored reference positions. With an amount of 30 bolts per revolution, a detection range of about 1 to 11 degrees may be reached. Further, it may also catch multiples of these intervals, for example 13 to 23 degrees, 25 to 35 degrees and so on. The supervision typically does not catch errors in the intervals bolt position±tolerance.

In a typical embodiment, the threshold value for triggering a signal may be adapted to the tolerance band.

In a typical embodiment, the supervision may trigger a warning and may curtail the power output of the wind turbine.

In an embodiment, the method may be implemented in a turbine control software, for example in the controller 230. In that case, it would not add any hardware costs, for example by adding an additional sensor wiring or a bracket. Thus, the above method is easy to implement. Further a precise measurement and validation of rotor position for active lift control (ALC) without encoder may be possible.

According to an embodiment, a method for controlling a wind turbine including a wind rotor shaft, a rotary encoder for measuring the azimuth angle of the wind rotor shaft is provided. Typically, the wind turbine further includes at least one impulse generating device including at least one first part and at least one second part, wherein the at least one first part is rotating with the wind rotor shaft and the least one second part is disposed stationary with respect to the wind rotor shaft such that the at least one first part moves by the at least one second part. In an embodiment the method includes: encoding the azimuth angle of the wind rotor shaft by the rotary encoder into a rotation value; generating an impulse when one of the at least one first part moves by one of the at least one second part of the impulse generating device; comparing a rotation value at the time of a detected impulse with a reference value.

In a typical embodiment, the at least one first part of the impulse generating device is a detecting device and the at least one second part is an impulse element.

In another embodiment, the at least one second part of the impulse generating device is a detecting device and the at least one first part is an impulse element.

In a further embodiment, which may be combined with other embodiments disclosed herein, the method further includes: generating a signal if a difference between the value of the rotary encoder at the time of a detected impulse and the reference value exceeds a predetermined threshold value.

In a typical embodiment, at least two or more, in particular more than 10, first parts are rotating with the rotor shaft.

In another embodiment, more than 20 first parts are rotating with the rotor shaft. In another embodiment, 30 first parts are rotating with the rotor shaft.

In a typical embodiment, which may be combined with other embodiments disclosed herein, the method further includes: generating a signal if a combination of the respective comparisons between the value of the rotary encoder at the time of a detected impulse and the respective reference values exceeds a predetermined threshold value.

In a further embodiment, which may be combined with other embodiments disclosed herein, the threshold value may depend on the distance between two first parts or two second parts of the impulse generating device, or on the maximum standard deviation.

In an embodiment, the combination is a sum of the comparisons of a complete rotation.

In a further embodiment, the at least one first part is or are disposed at regular intervals around the circumference of the rotor shaft.

In a typical embodiment, the at least one second part is disposed at regular intervals around the rotor shaft.

In another embodiment, the at least one first parts and/or the at least one second parts are disposed such that the spaces between the at least one first parts and/or the at least one second parts are increasing for a complete turn of the wind rotor shaft.

In an embodiment, which may be combined with another embodiment disclosed herein, the reference values correspond to the values of the rotary encoder when a first part moves by a second part of the impulse generating device, when the wind turbine is calibrated.

In another embodiment, which may be combined with other embodiments disclosed herein, the method may include: performing a calibration run, wherein during the calibration run the rotation value of a rotary encoder at the time of a detected impulse is stored as a reference value.

In a typical embodiment, the at least one impulse generating device generates an impulse having a rising edge and a falling edge when a first part is passed by a second part, wherein the method includes: comparing the rotation value of the rotary encoder at the mean time of rising edge and the falling edge of the impulse with a reference value.

Typically, the rotary encoder is an incremental encoder.

According to a further embodiment, a wind turbine including a wind rotor shaft, a rotary encoder for measuring the azimuth angle of the wind rotor shaft and for encoding the azimuth angle with a rotation value is provided. Typically, the wind turbine further includes at least one impulse generating device including at least one first part and at least one second part, wherein the at least one first part is rotating with the wind rotor shaft and the least one second part is disposed stationary with respect to the wind rotor shaft such that the at least one first part moves by the at least one second part. In an embodiment, the impulse generating device is adapted to generate an impulse when an at least one first part moves by an at least one second part; wherein the wind turbine further includes a control device adapted to receive a rotation value of the rotary encoder and adapted to be connected to the impulse generating device, wherein the control device is adapted to compare a rotation value of the rotary encoder at the time of a detected impulse with a reference value.

In a further embodiment, the at least one second part is a proximity sensor.

In another embodiment, the wind rotor shaft is driven by the wind rotor.

In a typical embodiment, which may be combined with other embodiments disclosed herein, the at least one first part is a bolt at a flange of the wind rotor shaft.

In a further embodiment, the control device is further adapted to generate a signal if a difference between the value of the rotary encoder at the time of a detected impulse and the reference value exceeds a predetermined threshold value.

Typically, the control device is further adapted to generate a signal if a combination of the respective comparisons between the value of the rotary encoder at the time of a detected impulse and the respective reference values exceeds a predetermined threshold value.

According to another embodiment, at least two or more, in particular more than 10, first parts are rotating with the rotor shaft.

Typically, the at least one first part is or are disposed at regular intervals around the circumference of the rotor shaft.

According to an embodiment, which may be combined with other embodiments disclosed herein, the impulse generating device is adapted to generate an impulse having a rising edge and a falling edge when a first part is moved by a second part, wherein the control device is adapted to compare the value of the rotary encoder at the mean time of rising edge and the falling edge of the impulse with a reference value.

According to a further embodiment, the impulse generating device is adapted to generate an impulse having a rising edge and a falling edge when a first part is passed by a second part, wherein the control device is adapted to compare the value of the rotary encoder at the time of rising edge or the falling edge of the impulse with a reference value.

This written description uses examples, including the best mode, to enable any person skilled in the art to make and use the described subject-matter. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a wind turbine comprising a wind rotor shaft, a rotary encoder for measuring an azimuth angle of the wind rotor shaft, and at least one impulse generating device comprising at least one first part and at least one second part, wherein the at least one first part is rotatable with the wind rotor shaft and the least one second part is disposed stationary with respect to the wind rotor shaft such that the at least one first part can move by the at least one second part; wherein the method comprises:

encoding an azimuth angle of the wind rotor shaft by the rotary encoder into a rotation value;
generating an impulse when one of the at least one first part moves by one of the at least one second part of the impulse generating device; and
comparing the rotation value at the time of the impulse with a reference value.

2. The method according to claim 1, further comprising:
generating a signal if a difference between the rotation value at the time of the impulse and the reference value exceeds a predetermined threshold value.

3. The method according to claim 1, wherein at least two first parts are rotating with the wind rotor shaft.

4. The method according to claim 3, further comprising:
generating a signal if a combination of the respective differences between each rotation value at the time of the impulse and its respective reference value exceeds a predetermined threshold value.

5. The method according to claim 4, wherein the combination is a sum of the differences between each rotation value at the time of the impulse and its respective reference value for a complete rotation of the wind rotor shaft.

6. The method according to claim 3, wherein the at least two first parts are disposed at a regular interval around a circumference of the wind rotor shaft.

7. The method according to claim 1, wherein the method further comprises:
performing a calibration run, wherein during the calibration run the rotation value at the time of the impulse is stored as the reference value.

8. The method according to claim 1, wherein the at least one impulse generating device generates an impulse having a rising edge and a falling edge when the one of the at least one first part moves by the one of the at least one second part, wherein the method comprises:
determining a difference between the rotation value at the mean time of the rising edge and the falling edge of the impulse and the reference value.

9. The method according to claim 1, wherein the rotary encoder is an incremental encoder.

10. A wind turbine comprising:
a wind rotor shaft;
a rotary encoder for measuring an azimuth angle of the wind rotor shaft and for encoding the azimuth angle into a rotation value;
at least one impulse generating device comprising at least one first part and at least one second part, wherein the at least one first part is rotatable with the wind rotor shaft and the least one second part is disposed stationary with respect to the wind rotor shaft such that the at least one first part can move by the at least one second part, wherein the impulse generating device is adapted to generate an impulse when one of the at least one first part moves by one of the at least one second part; and
a control device operatively connected to the rotary encoder and the impulse generating device, wherein the control device is adapted to compare the rotation value at the time of the impulse with a reference value.

11. The wind turbine according to claim 10, wherein the at least one second part is a proximity sensor.

12. The wind turbine according to claim 10, wherein the wind rotor shaft is driven by a wind rotor.

13. The wind turbine according to claim 10, wherein the at least one first part is a bolt at a flange of the wind rotor shaft.

14. The wind turbine according to claim 10, wherein the rotary encoder is an incremental encoder.

15. The wind turbine according to claim 10, wherein the control device is further adapted to generate a signal if a difference between the rotation value at the time of the impulse and the reference value exceeds a predetermined threshold value.

16. The wind turbine according to claim 10, wherein the at least one first part comprises at least two first parts, and wherein the control device is further adapted to generate a signal if a combination of the respective differences between each rotation value at the time of the impulse and its respective reference value exceeds a predetermined threshold value.

17. The wind turbine according to claim 10, wherein at least two first parts are rotating with the rotor shaft.

18. The wind turbine according to claim 17, wherein the at least two first parts are disposed at a regular interval around a circumference of the wind rotor shaft.

19. The wind turbine according to claim 10, wherein the impulse generating device is adapted to generate an impulse having a rising edge and a falling edge when the one of the at least one first part moves by the one of the at least one second part, wherein the control device is adapted to calculate a difference between the rotation value at a mean time of the rising edge and the falling edge of the impulse and the reference value.

20. The wind turbine according to claim 10, wherein the impulse generating device is adapted to generate an impulse having a rising edge and a falling edge when the one of the at least one first part moves by the one of the at least one second part, wherein the control device is adapted to calculate a difference between the rotation value at a time of the rising edge or the falling edge of the impulse with the reference value.

* * * * *

UNITED STATES PATENT AND TRADEMARK OFFICE
CERTIFICATE OF CORRECTION

| | | |
|---|---|---|
| PATENT NO. | : 8,029,233 B2 | |
| APPLICATION NO. | : 12/872659 | |
| DATED | : October 4, 2011 | |
| INVENTOR(S) | : Hoffmann et al. | |

It is certified that error appears in the above-identified patent and that said Letters Patent is hereby corrected as shown below:

In Column 5, Line 60, delete "nm" and insert -- run --, therefor.

In Column 7, Line 13, delete "nm," and insert -- run, --, therefor.

Signed and Sealed this
Tenth Day of January, 2012

David J. Kappos
*Director of the United States Patent and Trademark Office*